Figure 8:
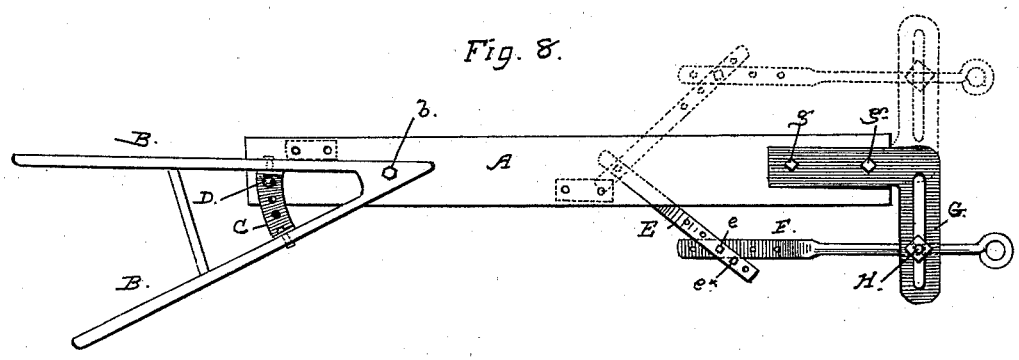

(No Model.) 3 Sheets—Sheet 1.
C. REBMANN.
VINEYARD CULTIVATOR.
No. 395,587. Patented Jan. 1, 1889.
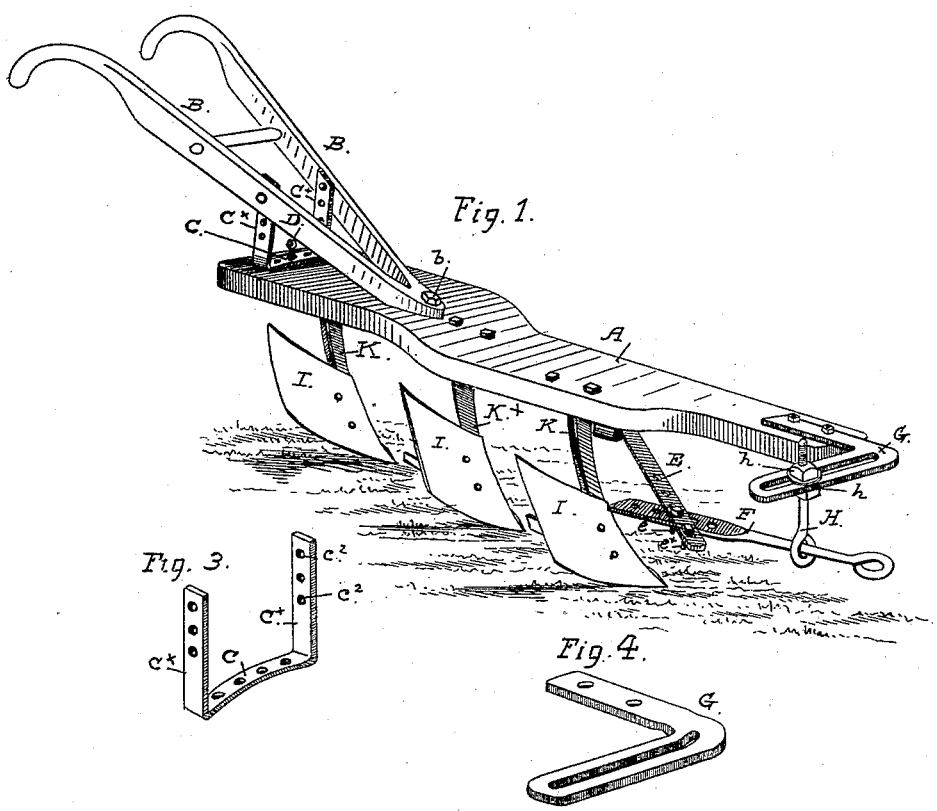
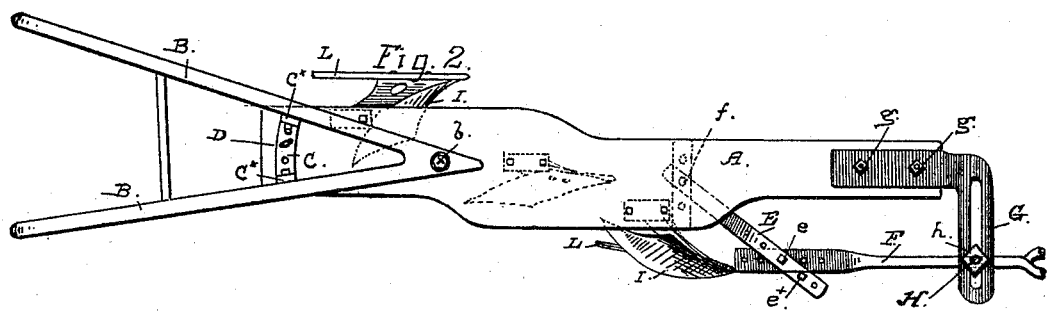
Witnesses:
Inventor:
Christian Rebmann
by E. E. Osborn
Atty.

(No Model.) 3 Sheets—Sheet 2.
C. REBMANN.
VINEYARD CULTIVATOR.
No. 395,587. Patented Jan. 1, 1889.
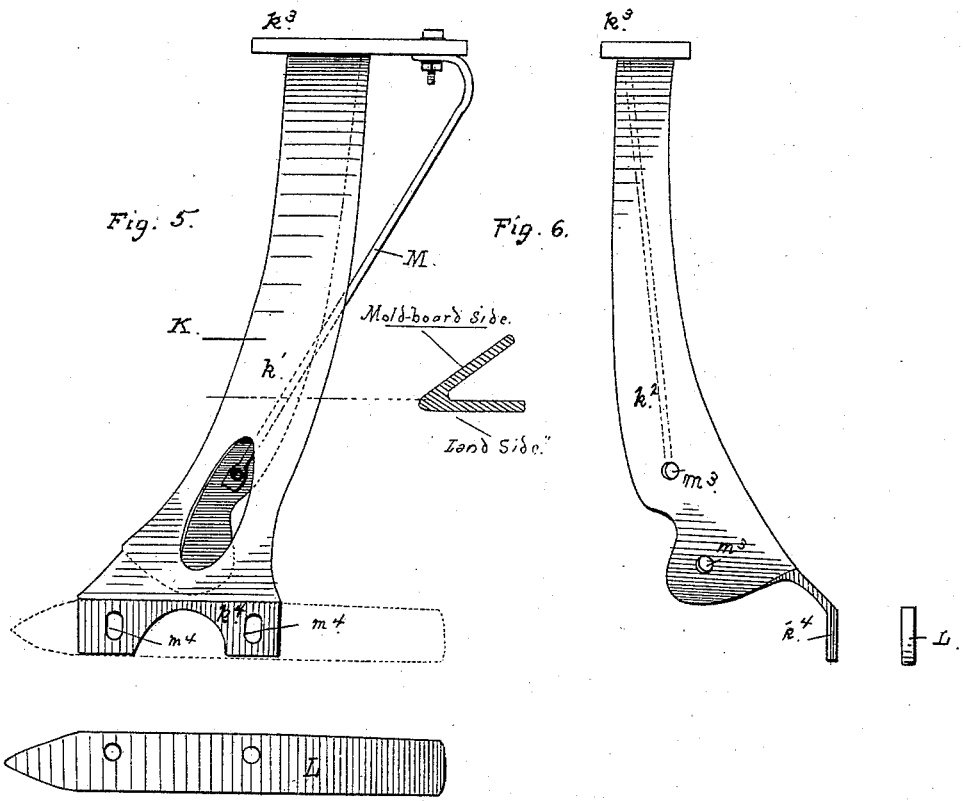
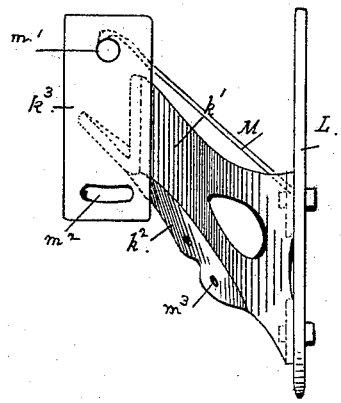

(No Model.) 3 Sheets—Sheet 3.

C. REBMANN.
VINEYARD CULTIVATOR.

No. 395,587. Patented Jan. 1, 1889.

Witnesses:
T. M. Brown
W. Thompson

Inventor.
Christian Rebmann
by E. E. Babbin
Atty.

UNITED STATES PATENT OFFICE.

CHRISTIAN REBMANN, OF NAPA, CALIFORNIA.

VINEYARD-CULTIVATOR.

SPECIFICATION forming part of Letters Patent No. 395,587, dated January 1, 1889.

Application filed September 29, 1887. Serial No. 251,082. (No model.)

*To all whom it may concern:*

Be it known that I, CHRISTIAN REBMANN, a citizen of the United States, residing in Napa, in the county of Napa and State of California, have invented certain new and useful Improvements in Vineyard-Cultivators; and I do hereby declare that the following is a full, clear, and exact description of my said invention, reference being had to the drawings that form part of this specification.

My invention has reference to improvements in cultivators for working the soil between rows of plants, vines, or trees; and it consists in certain novel construction and combination of parts, as hereinafter described, and pointed out in the claim.

Referring to the said drawings by figures and letters, Figure 1 is a perspective view of a plow or cultivator for vineyard-work in the construction of which my improvements have been applied and used. Fig. 2 is a top view of Fig. 1. Figs. 3, 4, 5, 6, and 7 are views in detail of the parts, Figs. 3 and 4 relating to the metal parts of the draft-fixtures and the handles, and Figs. 5, 6, and 7 showing the form of the plow-standards. Fig. 8 is a top view of a cultivator with a straight beam.

The novel points or features in this implement relate, first, to the part by which the handles are adjusted in two directions, or vertically and laterally; secondly, to the draft-regulating device, and, thirdly, to the plow-standards. These parts are applied to a single beam, A, which may be of the form shown in Fig. 1, to take three standards, or a straight and narrower beam, as shown in Fig. 8, when the space between the rows of vines or plants may require a narrow implement, and in this latter form the beam takes but two standards.

The handles B swing on the center bolt, $b$, to the right or left, and are set and held in any position of such lateral adjustment by the curved bar C, which is struck on a circle having its center at $b$, and has its ends turned up vertically to form upright arms $c^*$, one to each handle. These arms have spaced holes $c^2$ for bolts $d$, that pass through the handles, and the curved portion is also provided with holes for a bolt or pin, D, by which the bar is held to the beam. This single piece therefore fixes the handles at the required inclination and height from the ground to accommodate the person who is to run the implement, and also gives lateral adjustment of the handles and locks them when thus set. The curved bar slides on the top of the beam at the rear end, which may be faced with metal immediately under the bar, and the pin D takes into a hole in the beam and through one of the holes in the curved bar.

The fixtures or parts of the draft-bar and clevis consist of the flat bar E, attached at one end to the beam by a bolt, $f$, the draft-rod F, and the slotted clevis-plate G and hanger H. These by their general arrangement and combination keep the line of draft parallel with the beam, and also provide adjustment of the same to one side or the other in such manner that the draft-animals can be kept away from the row without affecting the draft. Thus to throw the soil either to or from the plants the handles are set in or away from that side of the beam which is to run next to the row, and the clevis-plate is turned and fixed in position to bring the draft-rod on the outer side of the beam. The plate is readily shifted by taking off the nuts $g$ and turning it so that the slotted part is brought to the right side of the beam, the hanger H being also changed to bring its loop undermost.

The line of draft is thrown to or from the beam by moving and setting the hanger in the slot, this being done by loosening the nuts $h$ above and beneath, and then tightening them after the rod is set, and afterward changing the bolts $e\,e^{\times}$ to the proper holes in the end of the bar E to bring the draft-rod parallel, or nearly so, with the beam. The implement can therefore be run up close to the vines or plants in the row without danger of injuring them or breaking off the shoots, as the side standards, K, are of such peculiar shape and construction that they set in under the beam, while the mold-boards or shovels, where such are used, stand out to take the soil.

The middle one of the standards, where three are used, is straight; but the outside ones, K, are bent or twisted to throw out the plows to the side. The points L and the mold-boards I are separate pieces, both detachable and reversible in the usual manner, so that when worn down they can be reversed or replaced by new ones; but the standard is cast in one piece. The top plate or flange, $k^3$, to set against the under side of the beam, has holes $m'$ $m^2$ for bolts, the front one of which is a slot concentric with a circle struck from the rear bolt-hole, $m'$, and by the two bolts that pass through the beam and through these flange-holes the standard is fixed and can be shifted also to throw the point of the plow to the right or the left. Suitable strength with lightness is obtained by making the shank $k'$ $k^2$ of channel-iron or angle-iron form in cross-section, and brace-rods M are carried from the bottom up to the flange $k^3$ to stiffen the standard.

The landside and plow-point L are secured to the lower end of one side or face, $k'$, of the angle-iron by bolts and nuts, the holes $m^4$ for which are elongated to let the point be set up or down, and to the face of the other side, $k^2$, is bolted the mold-board I.

The standards are cast rights and lefts, as will be understood from the position they occupy on the beam; but they take the same mold-boards and landsides, as the faces of the standards to which these parts are bolted are warped or twisted to bring the mold-board and landside in line and position for work when bolted to the standard. This will be understood from the views Figs. 5, 6, and 7.

Having thus fully described my invention, what I claim, and desire to secure by Letters Patent, is—

The standard K, having the sides $k'$ and $k^2$ arranged at an angle to each other, said side $k^2$ having the lower vertical extension, $k^4$, the point or landside L, bolted to said extension, the mold-board I, bolted to the side $k'$, the plate $k^3$ on the upper end of the standard and extending rearward therefrom, said plate having the opening $m'$ in the rear end and the concentric opening $m^2$ in its front end, for the purpose set forth, and the brace-rod M, having its upper end bolted under the rear end of plate $k^3$ and its lower end bolted to the inner side of side $k'$ at a suitable distance from the lower end of the standard, substantially as described.

In testimony that I claim the foregoing I have hereunto set my hand and seal.

CHRISTIAN REBMANN. [L. S.]

Witnesses:
 T. M. BROWN,
 W. THOMPSON.